(12) United States Patent
Gross

(10) Patent No.: US 12,699,287 B2
(45) Date of Patent: Aug. 4, 2026

(54) SAFETY GLASSES

(71) Applicant: Lucyd Ltd., London (GB)

(72) Inventor: Clifford Gross, Miami, FL (US)

(73) Assignee: Innovative Eyewear, Inc., North Miami, FL (US)

( * ) Notice: Subject to any disclaimer, the term of this patent is extended or adjusted under 35 U.S.C. 154(b) by 596 days.

(21) Appl. No.: 18/048,715

(22) Filed: Oct. 21, 2022

(65) Prior Publication Data

US 2023/0132887 A1 May 4, 2023

Related U.S. Application Data

(60) Provisional application No. 63/274,920, filed on Nov. 2, 2021.

(51) Int. Cl.
G02C 11/00 (2006.01)

(52) U.S. Cl.
CPC ..................................... G02C 11/12 (2013.01)

(58) Field of Classification Search
CPC ........................... G02C 11/12; G02C 2200/02; G02C 2200/08; G02C 7/16; G02C 11/10
See application file for complete search history.

(56) References Cited

U.S. PATENT DOCUMENTS

| | | |
|---|---|---|
| D535,317 S | 1/2007 | Wolfe |
| D536,026 S | 1/2007 | Bruck |
| 7,192,136 B2 | 3/2007 | Howell et al. |

| | | |
|---|---|---|
| 7,255,437 B2 | 8/2007 | Howell et al. |
| 7,380,936 B2 | 6/2008 | Howell et al. |
| 7,401,918 B2 | 7/2008 | Howell et al. |
| 7,438,410 B1 | 10/2008 | Howell et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,581,833 B2 | 9/2009 | Howell et al. |
| 7,621,634 B2 | 11/2009 | Howell et al. |

(Continued)

FOREIGN PATENT DOCUMENTS

| | | |
|---|---|---|
| AU | 2021105809 A4 | 10/2021 |
| CN | 100580507 C | 11/2005 |

(Continued)

OTHER PUBLICATIONS

Examination Report received in connection with Canadian Patent Application No. 3,180,624, dated Apr. 17, 2024.

(Continued)

*Primary Examiner* — Balram T Parbadia
*Assistant Examiner* — Ray Alexander Dean
(74) *Attorney, Agent, or Firm* — Ellenoff Grossman & Schole LLP; John Stellabotte; Danielle Cohen

(57) ABSTRACT

The present invention relates to the field of glasses, and in particular to a kind of safety glasses having removable shield members with one or more protruding tab members configured to be releasably received and/or connected to one or more receiving holes formed on glasses temples. The safety glasses also can have capability to receive and transmit music phone calls, and other audio. Connection or removal of a shield member does not disrupt functioning of the actuator buttons or transmission and reception of music, phone calls and other audio.

20 Claims, 5 Drawing Sheets

(56) References Cited

U.S. PATENT DOCUMENTS

| | | | |
|---|---|---|---|
| 7,677,723 B2 | 3/2010 | Howell et al. | |
| 7,771,046 B2 | 8/2010 | Howell et al. | |
| 7,792,552 B2 | 9/2010 | Thomas et al. | |
| 7,850,301 B2 | 12/2010 | DiChiara | |
| 7,908,679 B2 | 3/2011 | Wang | |
| 8,092,007 B2 | 1/2012 | Dichiara | |
| 8,109,629 B2 | 2/2012 | Howell et al. | |
| 8,203,502 B1 | 6/2012 | Chi et al. | |
| 8,337,013 B2 | 12/2012 | Howell et al. | |
| 8,430,507 B2 | 4/2013 | Howell et al. | |
| 8,434,863 B2 | 5/2013 | Howell et al. | |
| 8,465,151 B2 | 6/2013 | Howell et al. | |
| 8,500,271 B2 | 8/2013 | Howell et al. | |
| 8,744,113 B1 | 6/2014 | Rickards | |
| 8,770,742 B2 | 7/2014 | Howell et al. | |
| 8,905,542 B2 | 12/2014 | Howell et al. | |
| 9,033,493 B2 | 5/2015 | Howell et al. | |
| 9,488,520 B2 | 11/2016 | Howell et al. | |
| 9,547,184 B2 | 1/2017 | Howell et al. | |
| 9,632,331 B2 | 4/2017 | Marini et al. | |
| 9,690,121 B2 | 6/2017 | Howell et al. | |
| 9,910,298 B1 | 3/2018 | Sales et al. | |
| 10,042,186 B2 | 8/2018 | Chao et al. | |
| 10,060,790 B2 | 8/2018 | Howell et al. | |
| 10,061,144 B2 | 8/2018 | Howell et al. | |
| 10,310,296 B2 | 6/2019 | Howell et al. | |
| 10,330,956 B2 | 6/2019 | Howell et al. | |
| 10,345,625 B2 | 7/2019 | Howell et al. | |
| 10,359,311 B2 | 7/2019 | Howell et al. | |
| 10,539,459 B2 | 1/2020 | Howell et al. | |
| 10,777,018 B2 | 9/2020 | Varady et al. | |
| 10,824,132 B2 | 11/2020 | Horseman et al. | |
| 10,908,419 B2 | 2/2021 | Gross et al. | |
| 11,042,045 B2 | 6/2021 | Chao et al. | |
| 11,086,147 B2 | 8/2021 | Howell et al. | |
| 11,204,512 B2 | 12/2021 | Howell et al. | |
| 11,243,416 B2 | 2/2022 | Howell et al. | |
| 11,282,523 B2 | 3/2022 | Gross | |
| 11,326,941 B2 | 5/2022 | Howell et al. | |
| 11,487,138 B2 | 11/2022 | Blum et al. | |
| 11,513,371 B2 | 11/2022 | Howell et al. | |
| 11,536,988 B2 | 12/2022 | Howell et al. | |
| 11,630,331 B2 | 4/2023 | Howell et al. | |
| 11,644,361 B2 | 5/2023 | Howell et al. | |
| 11,644,693 B2 | 5/2023 | Howell et al. | |
| 11,721,183 B2 | 8/2023 | Van Muiswinkel | |
| 11,733,549 B2 | 8/2023 | Howell et al. | |
| 11,762,224 B2 | 9/2023 | Howell et al. | |
| 11,803,069 B2 | 10/2023 | Howell et al. | |
| 11,829,518 B1 | 11/2023 | Howell et al. | |
| 2014/0101812 A1 | 4/2014 | Richards | |
| 2019/0265516 A1* | 8/2019 | Chou | G02C 5/146 |
| 2020/0012110 A1 | 1/2020 | Blum et al. | |
| 2020/0292843 A1* | 9/2020 | Villalpando | G02C 5/001 |
| 2021/0082011 A1* | 3/2021 | Cohen | H04L 12/2809 |
| 2021/0304743 A1 | 9/2021 | Gross | |

FOREIGN PATENT DOCUMENTS

| | | | |
|---|---|---|---|
| CN | 202631872 | U | 12/2012 |
| CN | 103097939 | A | 5/2013 |
| CN | 102458325 | B | 8/2014 |
| CN | 204331191 | U | 5/2015 |
| CN | 104932679 | A | 9/2015 |
| CN | 105818741 | B | 3/2020 |
| DE | 102014200325 | A1 | 7/2014 |
| EP | 1124519 | A1 | 8/2001 |
| EP | 3699677 | A1 | 8/2020 |
| EP | 3519892 | B1 | 12/2020 |
| JP | 2016136290 | A | 7/2016 |
| JP | 5974007 | B2 | 8/2016 |
| KR | 200462199 | Y1 | 8/2012 |
| KR | 101604941 | B1 | 3/2016 |
| KR | 20210081599 | A | 7/2021 |
| KR | 102581983 | B1 | 9/2023 |
| WO | 2013164223 | A2 | 11/2013 |
| WO | 2016062423 | A1 | 4/2016 |

OTHER PUBLICATIONS

MELASA Safety Glasses Side Shields for Prescription Glasses, Slip on Clear Eye Glasses, Fits Small to Large Eyeglasses. Online. Internet. Accessed Jul. 23, 2024. https://www.amazon.com/Shields-Prescription-Glasses-Protection%C2%AD%20Eyeglasses/dp/B08L3R5JVL/ref=asc_df%20_%20B08L3R5JVL/?tag=hyprod-%2020&linkCode=dfO&hvadid=4%2075794949%201%2069&hvpos=&hvnetw=g&hvrand=%2011603898907150195%20536&hvpone=&hvptwo.

* cited by examiner

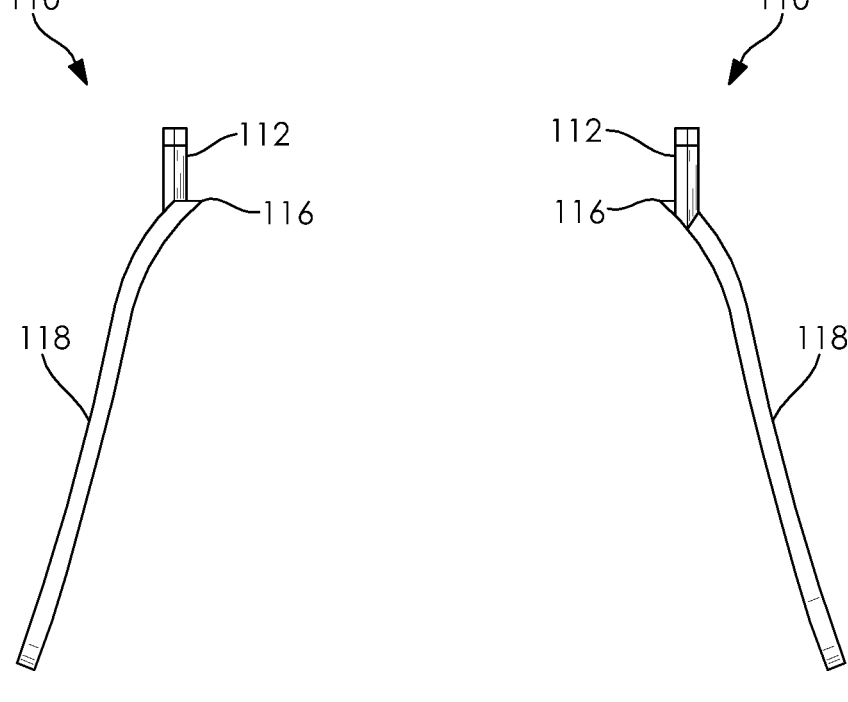
FIG. 7　　　　　　　FIG. 8

SAFETY GLASSES

CROSS-REFERENCE TO RELATED APPLICATIONS

This application claims the benefit of Provisional Application No. 63/274,920 entitled SAFETY GLASSES filed on Nov. 2, 2021, the entire disclosure of which is incorporated herein by reference.

FIELD OF THE INVENTION

The present invention relates to the field of glasses, and in particular to a kind of glasses having releasably attachable safety shield members.

BACKGROUND

Traditionally, glasses such as reading glasses, corrective eyeglasses, and sunglasses are purchased for the utility of the lenses, whether it is to help a user see clearly, read, or protect the user's eyes from the sun. Safety glasses have also been developed which, in addition to protecting a user's eyes or augmenting a user's vision, protect the side of a user's face by use of one or more face shields. However, these prior developed glasses either do not provide an option for easily removing the additional face shields, or lack the ability to quickly and easily modify the glasses by applying and/or removing the safety shields. Moreover, at present, sunglasses, prescription glasses, and/or smartglasses are not quickly and easily modifiable to include safety shield members configured to shield one or more sides of a user's face, and it would be advantageous and desirable to glasses users to be able to quickly and easily modify their glasses (e.g. smartglasses) to include protective shields, in some scenarios, while retaining the functions of being able to connect their smartglasses with other mobile devices (e.g., smartphones).

Prior-developed side shields for glasses, for example, Slip-on Clear Side Shields (https://www.amazon.com/Shields-Prescription-Glasses-Protection-Eyeglasses/dp/B08L3R5JVL/ref=asc_df B08L3R5JVL/?tag=hyprod-20&linkCode=df0&hvadid=475794949169&hvpos=&hvnetw=g&hvrand=11603898907150195 536&hvpone=&hvptwo), are configured to slide onto the temples of glasses, and either are difficult to be removed or cannot altogether be removed by a user while the user is working, for example, while the user is working with gloves. Moreover, these prior-developed safety shields must be taken off of a user's face in order to apply or remove the slip-on safety shields onto or from the glasses which hinders productivity.

Other prior-developed glasses, for example, the glasses described in U.S. Pat. Nos. 7,850,301 and 8,092,007, have lenses which include magnets to make the function of the glasses modifiable, for example, to enable a user to switch the function of glasses from, for example, prescription lensed glasses, to, for example, sun protective lensed glasses. However, these prior-developed glasses lack the ability to modify the glasses to include facial shield members, for example, to shield a side portion of a user's face, even while a user is wearing gloves or while the user's hands are oily or wet.

Therefore, there is a need in the art for a glasses system and/or safety shield system which provides users with the ability to quickly and/or easily modify glasses with one or more facial shield members, for example, while wearing the glasses. These and other features and advantages of the present invention will be explained and whose utility and benefit will become understandable to one skilled in the art through the summary of the invention that follows.

SUMMARY OF THE INVENTION

As described in further detail herein below, the methods and systems, and devices described herein employ a novel design for glasses which may be enabled with wireless communication technology and configured with quick connect magnetic shields to easily, inexpensively and efficiently change or update glasses devices to include eye protective safety shield members. In some examples, the glasses may be enabled with wireless communication technology, including the wireless communication technology described in U.S. application Ser. No. 16/022,097 entitled SMART-GLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION, now U.S. Pat. No. 10,908,419 and may additionally be configured with the quick connect hinges described in U.S. application Ser. No. 17/104,849 entitled WIRELESS SMARTGLASSES WITH QUICK CONNECT FRONT FRAMES to easily, inexpensively and efficiently change or update front frame designs of the glasses, for example, smartglasses. In some examples, the glasses may be enabled with voice assistant management and control software, including the voice assistant management software described in U.S. application Ser. No. 16/829, 841 entitled VOICE ASSISTANT MANAGEMENT to operate certain features of the safety glasses, for example, safety smartglasses, using a voice assistant manager software.

In accordance with embodiments of the present invention, one or more removable safety shield members may be provided which may be configured to easily and quickly releasably connect to the temples of glasses, for example, prescription or reading glasses, sunglasses, and/or smartglasses. For example, a pair of safety shield members may be provided, each of which may be configured to releasably connect to a temple and/or end piece of glasses, for example, smartglasses, sunglasses, reading and/or prescription glasses.

In accordance with embodiments of the present invention, the shield members of the present invention may include one or more magnet members configured to facilitate connection between the shield members and the temples of the glasses which may similarly comprise corresponding magnet members.

In accordance with embodiments of the present invention, the shield members may comprise one or more protruding tab members which may be additionally configured with one or more magnet members adapted to facilitate connection between the shield members and the temples of the glasses which may similarly comprise corresponding magnet members.

In accordance with embodiments of the present invention, the shield members may be configured to be easily inserted or removed from the glasses, for example, to support improved usage of the glasses, for example, before or after cleaning the glasses lenses.

In accordance with embodiments of the present invention, the glasses may be configured to be operable while the safety shields are inserted. For example, the glasses may be smartglasses including wireless technology which may be operable by use of buttons which may not be interrupted by the placement of the safety shields. For example, the safety shields may be connected to or disconnected from smartglasses without disrupting access to and functioning of any buttons which may be disposed on the temples of the smartglasses. Also for example, the safety shields may attach to a bottom surface of the glasses temples, for example, near a front end of the temples, without disrupting access to and functioning of any buttons which may be disposed on a middle section of the bottom surface of the temples or the functioning of the ability to transmit and receive music, phone calls and other audio.

In accordance with embodiments of the present invention, the shield members may be configured to enhance the safety of the glasses by opening an information channel, for example, an audible information channel which may be configured to provide instructions, training, and/or accident or injury notifications or other hazard alerts during use of the smartglasses.

It is an object of the present invention to provide safety shields which may be independently attachable to glasses, including prescription glasses, sunglasses, and/or smartglasses, which are configured to shield user's eyes and prevent materials, for example, debris, from entering user's eyes, for example, from the sides of the glasses.

It is another object of the present invention to provide safety shields which may be easy to install.

It is another object of the present invention to provide safety shields which may be easily installed by a user wearing gloves. For example, use of the safety shields and/or glasses may not be impaired or stunted by glovewearing.

It is another object of the present invention to provide safety shields which are installable on a pair of glasses while the glasses are worn on the face of a user. Similarly, it is an object of the present invention to provide safety shields which are removable from a pair of glasses while the glasses are worn on the face of a user.

It is another object of the present invention to provide safety shields which may be configured to easily and quickly attach to glasses to support convenience and ease of use of the shields.

It is another object of the present invention to provide safety shields which may include a magnetized component (e.g., a ferromagnetic material) which is configured to releasably secure the shields to the temples or end pieces of glasses to aide in easily attaching the shields to a pair of glasses, while making it simple for users to detach the shields from the glasses, if so desired.

It is another object of the present invention to provide safety shields which do not require fidgeting to install and do not obstruct access to any buttons on the glasses, for example, actuation buttons disposed on the temples of smartglasses.

It is another object of the present invention to provide a safety glasses assembly, which may be, for example, a pair of prescription smartglasses capable of connecting to safety shields to enable users to wear the glasses for both safety and non-safety applications, for example, without requiring additional expenses for a second pair of glasses (e.g., a first pair of glasses being, for example, prescription glasses, and a second pair of glasses being, for example, safety glasses).

In accordance with an embodiment of the present invention, a glasses assembly may comprise a front frame, a pair of temples having one or more receiving holes disposed on a bottom surface thereof, and a pair of removable shield members connectable to the temples, each shield member having a shield portion and one or more tab members extending from a top section of each of the shield portions and corresponding in shape to the temple receiving holes. In some scenarios, the temple receiving holes may each adapted to receive and releasably secure a shield member of the pair.

In accordance with an embodiment of the present invention, a smartglasses assembly may comprise a front frame, a pair of temples, each having an opening disposed on a bottom surface thereof and extending a distance into the temples to form a channel, the channel terminating at an end wall in communication with at least one ferromagnetic member, and a pair of removable shield members connectable to the temples, each shield member having a shield portion and a tab member extending from a top surface of the shield portion and adapted to friction fit within a corresponding channel of the temple, each tab member further comprising at least one ferromagnetic element adapted to engage with at least one ferromagnetic member of the temples.

In accordance with embodiments of the present invention, a removable shield member for glasses may comprise a shield portion comprising a curved sidewall, and one or more tab members extending from a top surface of the shield portion, each having one or more magnetic members disposed thereon. In some examples, the tab members may be formed to correspond to one or more receiving holes disposed on glasses temples. In some scenarios, the tab members may be formed to correspond to one or more receiving holes disposed on glasses end pieces. In some embodiments, the tab members may be configured to friction fit within the temple receiving holes. In some examples, the tab members may protrude from a top portion of the shield portion. In some embodiments, at least one tab member may be curved and at least one tab member is straight. In some scenarios, the straight tab member may be configured to engage with at least one temple receiving hole. In some embodiments, a pair of said removable shield members may be configured to connect to smartglasses to shield a side portion of a user face, the smartglasses comprising wireless communication technology configured and programmed to transmit and receive electronic signals.

BRIEF DESCRIPTION OF THE DRAWINGS

Accompanying this written specification is a collection of drawings of exemplary embodiments of the present invention. One of ordinary skill in the art would appreciate that these are merely exemplary embodiments, and additional and alternative embodiments may exist and still be within the spirit of the invention as described herein.

FIG. 7 shows a first side view of a shield member in accordance with an embodiment of the present invention.

FIG. 8 shows a second side view of a shield member in accordance with an embodiment of the present invention.

DETAILED DESCRIPTION

Figure 1:
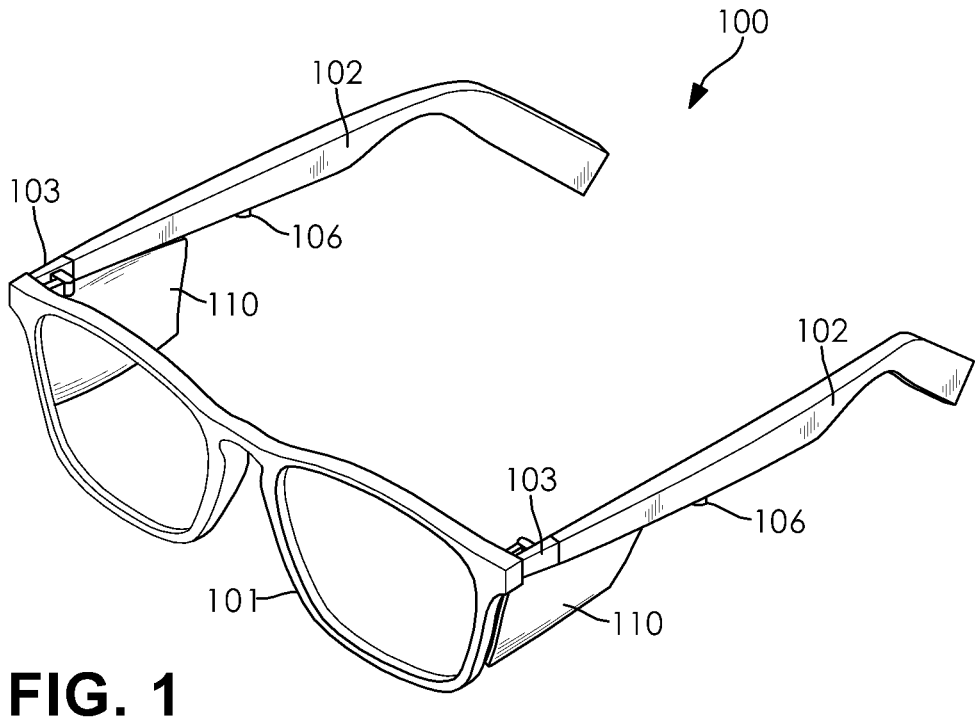
FIG. 1 shows a perspective view of glasses with shield members attached at the temples in accordance with an embodiment of the present invention.

The present invention is generally directed toward glasses (e.g. prescription or reading glasses, sunglasses, and/or smartglasses) having the ability to quickly and/or easily modify the glasses to include face protecting shield members. In some embodiments, the glasses may include "smart" functionalities, including the ability to connect to a network to share, transmit and interact with other electronics remotely. In accordance with embodiments of the present invention, the glasses may be "smart" glasses which incorporate Bluetooth® or other wireless technologies, including the technologies disclosed in U.S. application Ser. No. 16/022,097 entitled SMARTGLASSES AND METHODS AND SYSTEMS FOR USING ARTIFICIAL INTELLIGENCE TO CONTROL MOBILE DEVICES USED FOR DISPLAYING AND PRESENTING TASKS AND APPLICATIONS AND ENHANCING PRESENTATION AND DISPLAY OF AUGMENTED REALITY INFORMATION now U.S. Pat. No. 10,908,419 which allow users to transmit and receive communications and data, while also providing users with the flexibility to choose and change the style of the front frame of the device and may additionally be configured with the quick connect hinges described in U.S. application Ser. No. 17/104,849 entitled WIRELESS SMARTGLASSES WITH QUICK CONNECT FRONT FRAMES, to easily, inexpensively and efficiently change or update front frame designs of the glasses, for example, smartglasses. In some examples, the glasses may be enabled with voice assistant management and control software, including the voice assistant management software described in U.S. application Ser. No. 16/829,841 entitled VOICE ASSISTANT MANAGEMENT to operate certain features of the safety glasses, for example, safety smartglasses, using a voice assistant manager software.

In some embodiments, at least one of the temples may comprise a printed circuit board, memory, battery, camera, microphone, speakers, connectivity module, cellular communications unit and hardware, and artificial intelligence interface in electronic communication, the connectivity module and the cellular communications unit and hardware configured and programmed to pair or connect the smartglasses to a smartphone, smartwatch, or other devices or systems and support active priority for the smartphone, the smartwatch, or the other device or systems, the smartglasses configured and programmed to receive oral requests or commands at the microphone and artificial intelligence interface to perform mobile device tasks or applications and process and communicate the oral requests or commands to a mobile device application controlling paired or connected devices or systems used for display or presentation of information related to the requested or commanded tasks or applications, the mobile device application and the artificial intelligence interface are programmed or configured to control paired or connected devices used for display or presentation of information related to requested or commanded tasks or applications and to display or present information related to the requested or commanded tasks or applications on the smartglasses, a paired or connected smartwatch, smartphone, or other paired or connected devices or systems, based on default settings, and to activate connections between the paired or connected smartglasses, smartphone, the smartwatch or additional devices or systems having higher priority until a capacity for connection with the smartglasses, the smartphone, the smartwatch, or other paired or connected devices or systems is reached, and receive at the microphone oral commands to override or switch the default settings and display or present information on a paired or connected as specified in the override or switch commands at the microphone and artificial intelligence and process and communicate the oral requests or commands to the mobile device application controlling paired or connected devices used for display or presentation of information related to requested or commanded tasks or applications switch display from a mobile device specified in the default settings to the paired or connected device or devices specified in the switch or override command.

In accordance with embodiments of the present invention, a smartglasses device may be controlled by a smartglasses mobile application, wherein the mobile device application controlling paired or connected devices used for display or presentation of information related to requested or commanded tasks or applications is the smartglasses mobile application.

In accordance with embodiments of the present invention, one or more removable safety shield members may be provided which may be configured to easily and quickly releasably connect to the temples of glasses, for example, prescription or reading glasses, sunglasses, and/or smartglasses. For example, two safety shield members may be provided, each of which may be configured to connect to a temple of glasses, for example, smartglasses, sunglasses, reading or prescription glasses. In some embodiments, the safety shield members may include anti-fog and/or anti-abrasion coatings. For example, the safety shield members may be dipped, sprayed or laminated with anti-fog or anti-abrasion coatings, including with, for example, anti-fog polycarbonate films and/or scratch resistant coatings, to prevent the shield members from becoming fogged and/or scratched. In some scenarios, the safety shield members may be configured as quick-connect shield members, which may be utilized by users to quickly and efficiently update their glasses (e.g., prescription glasses, sunglasses, smartglasses and the like) to include one or more facial safety shields, or alternatively, quickly and efficiently remove previously attached shields to return their glasses to their non-safety configuration (e.g., back to their use as prescription glasses, sunglasses, and/or smartglasses, etc.).

In accordance with embodiments of the present invention, the shield members may be configured to be easily inserted or removed from the glasses, for example, to support improved usage of the glasses, for example, before or after cleaning the glasses lenses. For example, the shield members may be removed to enable a user to properly clean the glasses lenses, and then quickly and easily reattached after such a cleaning. In some examples, the protruding tabs with magnet members disposed thereon support the quick and easy application or removal of the safety shields to the glasses temples, for example, before or after lens cleanings.

In accordance with embodiments of the present invention, the glasses may be configured to be operable before, during, and/or after the safety shields are inserted. For example, the glasses may be smartglasses including wireless technology which may be operable by use of buttons which may not be interrupted by the placement of the safety shields. For example, the safety shields may be applied to smartglasses without disrupting access to any buttons which may be disposed on the temples of the smartglasses. Also for example, the safety shields may be disposed on a bottom surface of the glasses temples and/or end pieces, for example, near a front end of the temples, without disrupting access to any buttons which may be disposed on the temples of the smartglasses, for example, a button disposed on a middle section of the temples. In some examples, the placement of the receiving holes disposed on the temples, the placement of the protruding tabs on the shield members and/or the shape of the safety shield members, for example, the curved shape of the shield portion, may enable operation of buttons disposed on the glasses temples, for example, smartglasses control buttons, while the shield members are inserted in the temples.

In accordance with embodiments of the present invention, the shield members may be configured to enhance the safety of the glasses by providing a safety features to glasses, for example, smartglasses while opening an information channel, for example, an audible information channel which may be provided by the smartglasses, which may be configured to provide instructions, training, and/or accident or injury notifications or other hazard alerts during use of the smartglasses.

In accordance with embodiments of the present invention, the shield members of the present invention may include one or more magnet members configured to facilitate connection between the shield members and the temples and/or end pieces of the glasses which may similarly comprise corresponding magnet members.

In accordance with embodiments of the present invention, the shield members may comprise one or more protruding tab members. In some examples, the protruding tab members may extend from a top portion of the shield members and may be configured to attach to a bottom portion of the temples. In some embodiments, the protruding tabs may be substantially rectangular shaped, however, in any embodiment, the protruding tabs may have any similarly suitable shape configured to permit connection between, for example, a shield member and a temple, for example, triangular, square, hexagonal, octagonal, oval or circle-shaped protruding tabs. In some scenarios, the one or more magnets may be disposed on the protruding tab members extending from the shield members and may be configured to connect to magnet members disposed in or near the receiving holes in the temples. In some examples, the magnet members may be disposed on a top portion of the protruding tab members. In some examples, the protruding tab members may substantially correspond in shape, size and orientation to receiving holes disposed on the temples. In some examples, the protruding tab members may be adapted to friction fit within the receiving holes of the temples. In some examples, at least of a portion of the protruding tab members may be magnetic. In some embodiments, the protruding tab members may be configured to clip or snap-fit into the receiving holes in the temples.

In some examples, the one or more shield protruding tab members may be configured to extend from the shield member in a straight, angled manner. Advantageously, at least two protruding tab members may extend from the shield member to support stable connection to the temples, and prevent movement or dislodgment of the shield members from the temples. In some examples, at least one tab member may be a straight tab member (e.g. extending straight up from a top portion of a shield member) and one tab member may be an angled tab member (e.g. extending from a top portion of the shield member at an angle). In some examples, an angled tab member may be curved.

In accordance with embodiments of the present invention, the shield members may be formed of a transparent or non-transparent material. In some examples, the material may be a plastic material. In any embodiment, the shield members may be formed of any suitable thermoplastic polymer resin, for example, polyethylene terephthalate (PET) or polyethylene terephthalate glycol (PET-G), acetate, polycarbonate or any similarly suitable plastic material. In some examples, the shield members may be 3D printed. In any embodiment, the shield members may be formed of any material capable of being 3D printed.

In some examples, the shield members may comprise a shield portion. In some scenarios, the shield portion may be curved. In some examples, curved shield members may support user comfort and/or prevent obstructing a user's visual ability (e.g. view). In some embodiments, the shield portion may be curved to correspond to the curvature of glasses' temples. For example, if a given temple is curved to a certain degree, a shield portion may substantially correspond or match the degree of curvature of the temples, such that, for example, the exterior and/or interior surface of the shield portion may be flush with the exterior surface of the given temple.

In accordance with embodiments of the present invention, each of the temples may comprise one or more magnet members configured to wirelessly connect the temples to one or more protective shields having one or more corresponding magnet members disposed thereon.

In accordance with embodiments of the present invention, each of the temples may comprise one or more receiving holes configured to receive one or more protruding tabs extending from the removable shield members. In some examples, the receiving holes may be magnetized, e.g., may include one or more magnet members disposed at or near the receiving holes, configured to quickly and easily connect to the protruding tab members, for example, to protruding tab members comprising corresponding magnet members.

Additionally or alternatively, the temples may comprise protruding tab members and the shield members may comprise receiving holes as herein described.

In accordance with embodiments of the present invention, a smartglasses device may comprise a connectivity module configured to wirelessly connect the temples to a mobile device. In some embodiments, the hinges of the glasses (e.g. smartglasses) may be standard hinges or may be the hinges described in U.S. application Ser. No. 17/104,849. For example, the glasses may comprise a removable front plate comprising hinges and rims, the rims comprising lenses, and temples releasably connected to the hinges, wherein the hinges and the temples connect by a friction fit and at least one of the temples comprise electronics components configured and programmed to transmit and receive electronic signals.

In accordance with embodiments of the present invention, a glasses device (e.g. a smartglasses device) may comprise a front frame comprising a bridge member connecting a pair of rims having a pair of lenses disposed therein, and a pair of hinge elements each comprising an insert component having a first end opposite a second end, with the first end pivotally connected to the front frame, and a pair of temples, each having a hinge receiving hole adapted to releasably connect with the second end of the insert component, at least one of the temples further comprising a connectivity module configured to wirelessly connect the temples to a mobile device. In some embodiments, the insert components may be substantially flat and may releasably connect to corresponding receiving holes in the temples by means of a friction fit. In some embodiments, each of the hinges may comprise one or more tab elements substantially corresponding in size and orientation to openings in one or more interior side walls of the receiving holes to selectively secure the temples to the front plate. In some embodiments, each of the hinges may be flexible and spring loaded and may enable the temples to be extended beyond ninety degrees relative to the front frame. In some examples, the temples may further comprise one or more receiving holes configured to receive one or more protruding tab members extending from a shield member. In some examples, one or more magnet members may be disposed on or near the receiving holes and may be configured to quickly and easily connect to corresponding magnet members disposed on one or more protruding tab members extending from a protective shield member. In some embodiments, each shield member may be an independent member configured to releasably connect to the temples of glasses or smartglasses devices.

In accordance with embodiments of the present invention, a glasses device (e.g. a smartglasses device) may comprise a front frame comprising a bridge member connecting a pair of rims having a pair of lenses disposed therein, and a pair of hinge elements. The smartglasses device may further comprise a pair of temples, each having a hinge receiving hole adapted to releasably connect with the second end of the insert component, the temples further comprising a connectivity module configured to wirelessly connect the temples to a mobile device. In some embodiments, the hinge elements may each extend from a rear side of the front frame and comprise a substantially round portion. In some embodiments, the hinge elements may connect to the receiving holes by means of a releasable friction fit. In some embodiments, the temples may be configured to releasably fasten or lock to the front frame when the hinge elements are inserted into the receiving holes and the temples are twisted in a first direction to secure the pivot hinges to the interior of the receiving holes. In some embodiments, the receiving holes are configured to unfasten or unlock the hinge elements when the temples are twisted ninety degrees in a second direction, opposite the first direction. In some examples, the temples may further comprise one or more receiving holes configured to receive one or more protruding tab members extending from a shield member. In some examples, one or more magnet members may be disposed on or near the receiving holes and may be configured to quickly and easily connect to corresponding magnet members disposed on one or more protruding tab members extending from a protective shield member. In some embodiments, each shield member may be an independent member configured to releasably connect to the temples of glasses or smartglasses devices.

In accordance with embodiments of the present invention, a glasses assembly (e.g. a smartglasses assembly) may comprise: a front frame, a pair of temples having one or more receiving holes disposed thereon, and one or more removable shield members releasably connectable to the temples, each shield member having a shield portion and one or more protruding tab members. In some examples, the temple receiving holes may be adapted to receive and releasably secure the shield members to the temples. In some examples, the temple receiving holes and the shield member protruding tabs may releasably connect by a friction fit. In some embodiments, at least one of the temple protruding tab members may have one or more magnetic members disposed thereon. In some embodiments, the temple receiving holes may have one or more magnetic members disposed therein. In some examples, the magnet members of the protruding tab members are configured to releasably connect to the magnet members of the receiving holes. In some embodiments, the ability for the protruding tab members to magnetically connect to the receiving holes of the temples may enable a user's use of the glasses assembly while wearing gloves or while the user's hands are wet or oily. In some embodiments, at least one of the temples may comprise electronics components configured and programmed to transmit and receive electronic signals. In some embodiments, the receiving holes may be formed on a bottom side of the temples. In some embodiments, the tab members may extend from a top portion of the shield members.

In accordance with embodiments of the present invention, a removable shield member may comprise: a shield portion comprising a curved member, and one or more protruding tab members, at least one protruding tab member having one or more magnetic members disposed thereon. In some embodiments, the protruding tab members may be formed to correspond to one or more receiving holes disposes on glasses temples. In some embodiments, the protruding tab members may be configured to friction fit within the temple receiving holes. In some examples, the tab members may protrude from a top portion of the shield portion. In some embodiments, at least one tab member may be curved and at least one tab member may be straight. In some examples, the curved tab member may be configured to pivotally engage with at least one temple receiving hole.

In accordance with embodiments of the present invention, a removable shield member for glasses may comprise: a shield portion comprising a curved sidewall; and one or more tab members extending from a top surface of the shield portion, each having one or more magnetic members disposed thereon.

Figure 2:
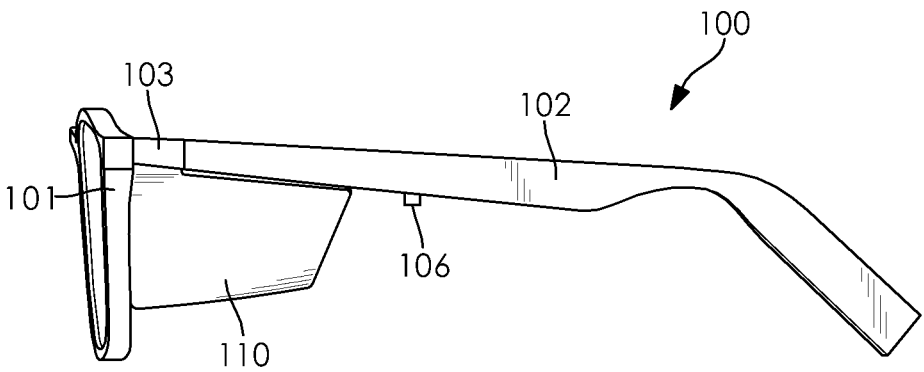
FIG. 2 shows a side view of glasses with shield members attached at the temples in accordance with an embodiment of the present invention.
Figures 3, 4:
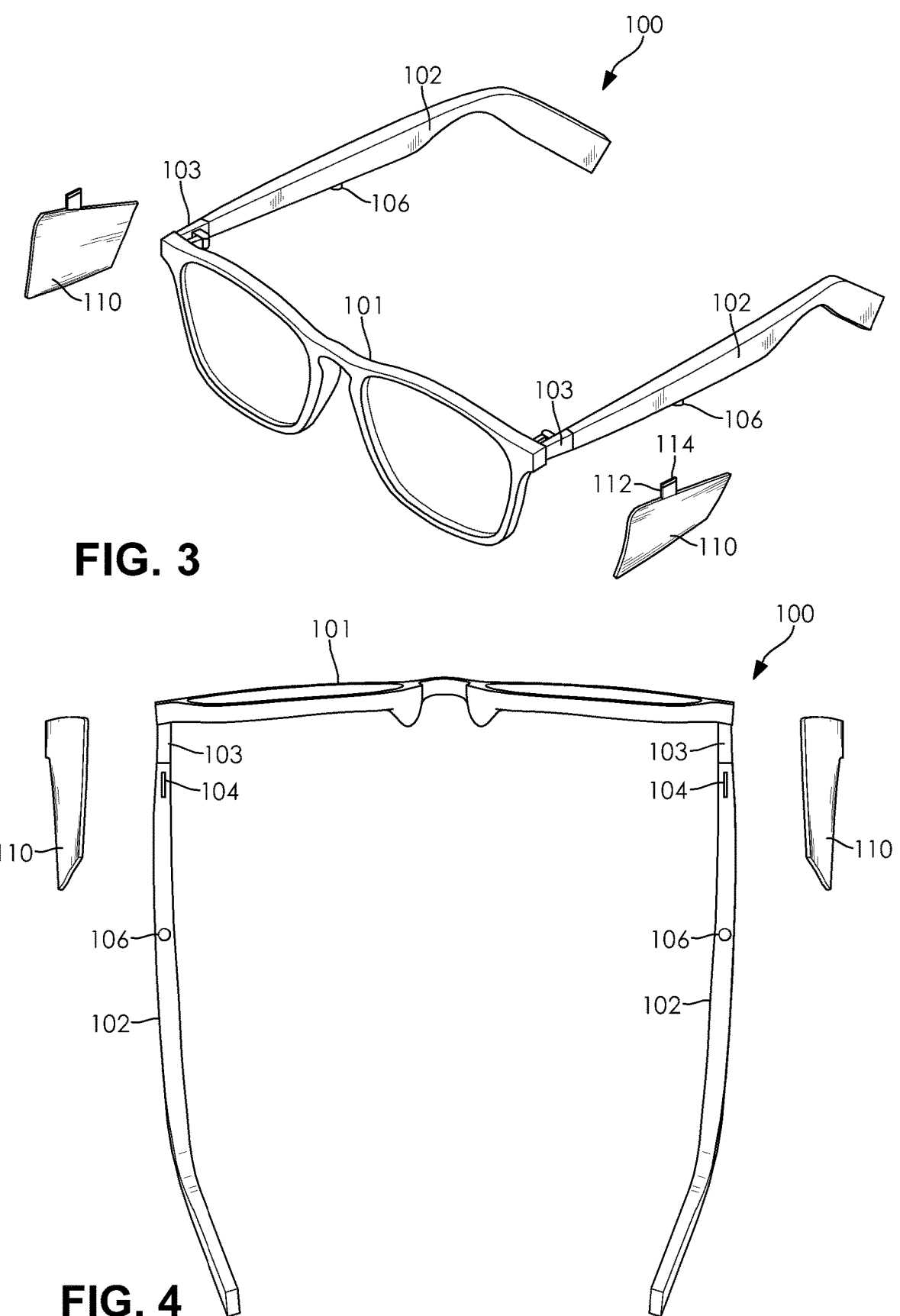
FIG. 3 shows a perspective view of glasses with shield members detached from the temples in accordance with an embodiment of the present invention.
FIG. 4 shows a bottom view of glasses with shield members detached from the temples in accordance with an embodiment of the present invention.
Figure 5:
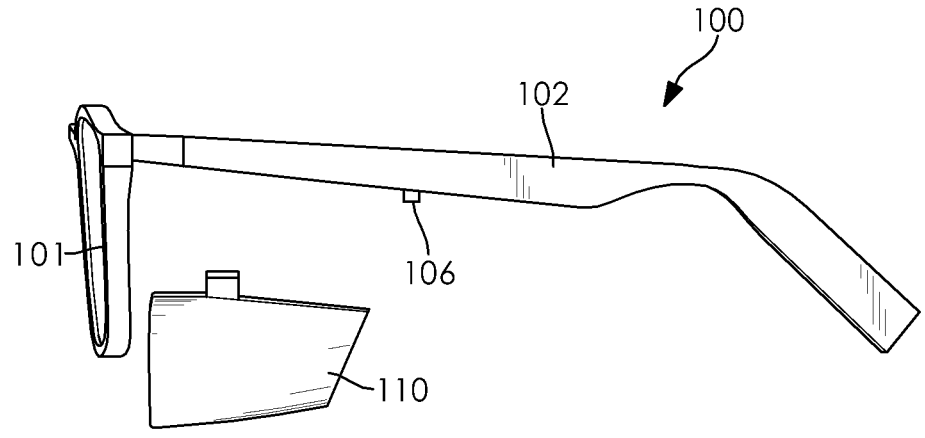
FIG. 5 shows a side view of glasses with shield members detached from the temples in accordance with an embodiment of the present invention.
Figure 6:
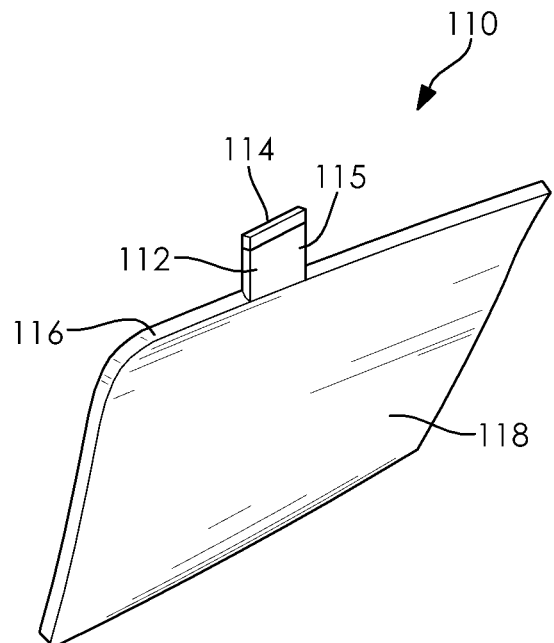
FIG. 6 shows a perspective view of a shield member in accordance with an embodiment of the present invention.
Figure 9:
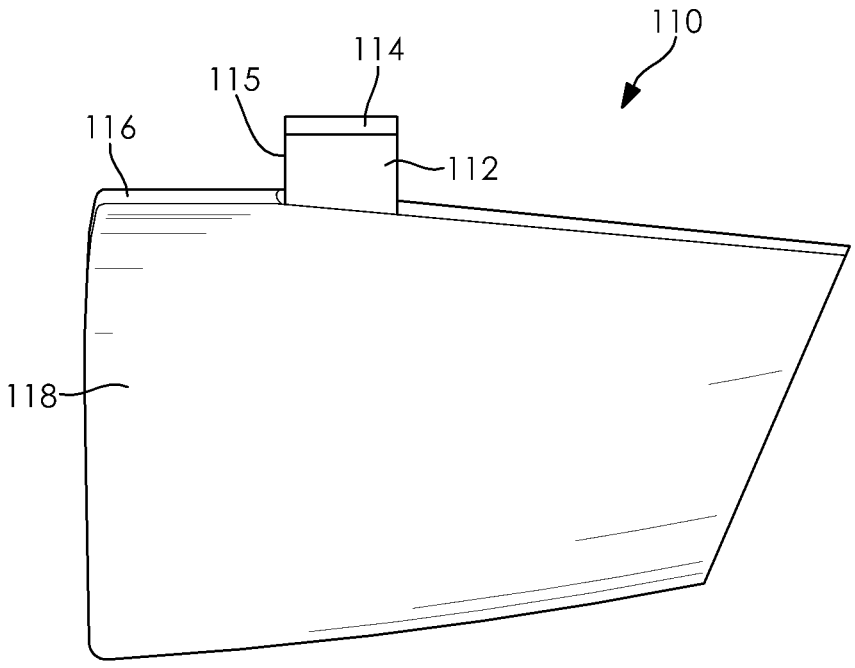
FIG. 9 shows a rear view of a shield member in accordance with an embodiment of the present invention.
Figure 10:
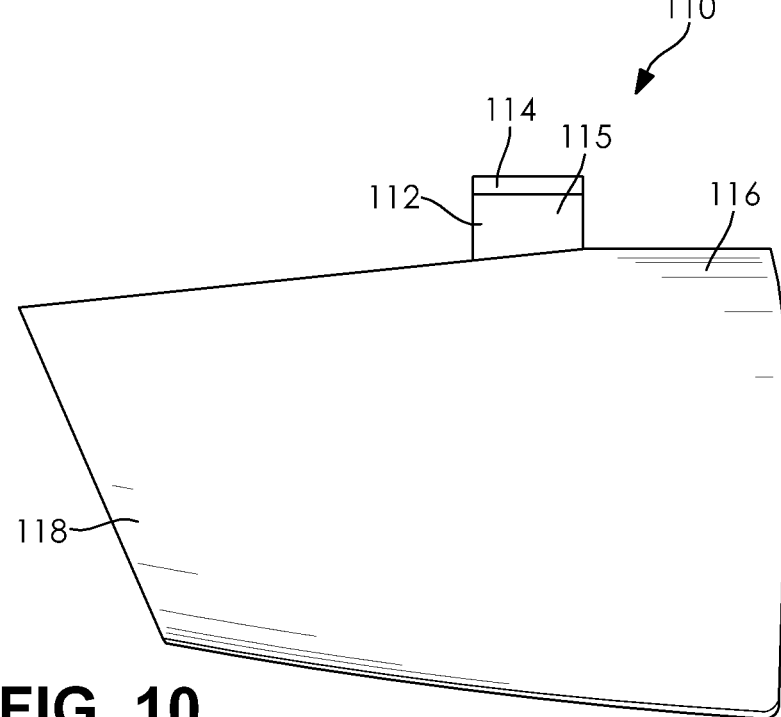
FIG. 10 shows a front view of a shield member in accordance with an embodiment of the present invention.

Turning now to the figures, FIGS. 1-5 demonstrate exemplary embodiments of the present invention wherein a glasses device 100 comprises a front frame member 101 having a pair of temples 102, one or both of which may be configured with wireless communication and audio transmission technology. As shown in the depicted example, attached to the temples 102 of the glasses device 100 may be one or more shield members 110, which may be releasably engageable with the temples 102. FIGS. 6-10 demonstrate exemplary embodiments of the shield members 110 in accordance with embodiments of the present invention.

FIGS. 1-5 generally depict a glasses device 100 having one or more removable safety shield members, in accordance with embodiments of the present invention. As shown in the depicted example, each of the temples 102 may comprise one or more receiving holes 104 configured to receive one or more protruding tabs 112 extending from the removable shield members 110. In some examples, the receiving holes 104 may be magnetized, e.g., may include one or more magnet members comprised of a ferromagnetic material disposed at or near the receiving holes 104, configured to quickly and easily connect to the protruding tab members 112, for example, to protruding tab members 112 comprising corresponding magnet members 114. In the depicted embodiment, the receive holes are shown as being disposed on a bottom side of the temples 102. In some scenarios, the receiving holes 104 are disposed on a front portion of the temples 102, for example, closer to a first end of the temples 102. In some embodiments, the receiving holes 102 may be formed on the end pieces 103 of the glasses 100.

FIGS. 6-10 generally depict safety shield members 110 in accordance with embodiments of the present invention. As shown in the depicted examples, the shield members 110 may comprise one or more protruding tab members 112. As shown in the illustrated embodiment, in some examples, the protruding tab members 112 may extend from a top portion of the shield members 110 and may be configured to attach to a bottom portion of the temples 102. In some embodiments, the protruding tabs 112 may be substantially rectangular shaped, however, in any embodiment, the protruding tabs 112 may have any similarly suitable shape configured to permit connection between, for example, a shield member 110 and a temple 102, for example, triangular, square, hexagonal, octagonal, oval or circle-shaped protruding tabs 112. In some scenarios, one or more magnet members 114 may be disposed on or within the protruding tab members 112 extending from the shield members 110 and may be configured to connect to magnet members disposed in or near the receiving holes 104 in the temples. In any embodiment, the magnet members 114 may be formed of a ferro-magnetic material capable of magnetization. In some examples, the magnet members 114 may be disposed on a top portion of the protruding tab members 112. In some examples, the protruding tab members 112 may substantially correspond in shape, size and orientation to receiving holes 104 disposed on the temples 102. In some examples, the protruding tab members 112 may be adapted to friction fit within the receiving holes 14 of the temples. In some examples, at least of a portion of the protruding tab members 112 may be magnetic. In some embodiments, the protruding tab members 112 may be configured to clip or snap-fit into the receiving holes 104 in the temples. In some examples, the combination of the protruding tabs 112 and the magnet members 114 prevent inadvertent dislodgement of the shield members 110 from the glasses 100.

In some examples, the one or more shield protruding tab members 112 may be configured to extend from a shield member 110 in a straight or angled manner. Advantageously, at least two protruding tab members 112, for example, a first protruding tab member 115 and a second protruding tab member 116, may extend from the shield member 110 to support stable connection to the temples 102, and prevent movement or dislodgment of the shield members 110 from the temples 102. As shown in the depicted embodiment, in some examples, the first protruding tab member 115 may be a straight tab member (e.g. extending substantially perpendicularly from a top surface of a shield member 110) and the second tab member 116 may be an angled or curved tab member (e.g. extending from a top portion of the shield member 110 at an angle). In some examples, the angled tab member may define a curved edge of the shield member 110. As shown in the illustrated embodiment, in some examples, an angled tab member 112, for example, the second tab member 116, may be curved. In some embodiments, a portion of the shield member 110, for example, a side portion of the shield member 110, may be formed to abut a portion of the rear side of the front frame 101. In some examples, a top portion of the shield member 110 may be formed to substantially abut a bottom portion of a temple 102 and/or end piece 103. In some examples, a portion of the safety shields 110, the first tab member 115 and/or second tab member 116, may be formed to abut a portion of the bottom side of the temples. In some embodiments, the second tab member 116 may be configured as a molding, at least a portion of which may be configured to substantially abut at least a bottom portion of the temples. In some examples, a side portion of the shield portion 118 may be configured to substantially abut at least a rear portion of the front frame member 101. In some examples, the structure of the shield portion 118 and the first and second tab members 115 and 116 may be configured to substantially block small particles (e.g. debris) from nearing or entering a user's eye. In some examples, the second tab member 116 curves to meet the front frame 101.

In accordance with embodiments of the present invention, the shield members 110 may be formed of a transparent or non-transparent material. In some examples, the material may be a plastic material, for example, a polycarbonate plastic material.

In some examples, the shield members 110 may comprise a shield portion 118. In some scenarios, the shield portion 118 may be curved. In some examples, curved shield members 110 may support user comfort and/or prevent obstructing a user's visual ability (e.g. view). In some embodiments, the shield portion 118 may be curved to correspond to the curvature of glasses' temples 102. For example, the temples 102 may be curved a predetermined degree and the shield portions 118 may substantially correspond or match the degree of curvature of the temples 102, such that, for example, the exterior and/or interior surface of the shield portion 118 may be flush with the exterior surface of the temples 102. Moreover, at least one side wall of the shield portion 118 may be curved to match the curvature of a front frame of a pair of glasses, for example, such that the side wall of the shield portion 118 may be flush with (e.g., abut) a rear surface of the front frame. In this way, the shield members 110 may effectively prevent matter such as debris from entering an eye area of a user wearing the glasses and safety shield assembly. In some examples, placement of the shield members 110 along a bottom portion of the temples 102 is configured not to interfere with the actuation button 106, for example, with access to the actuation button 106.

In some examples, the temples 102 of the glasses 100 may include wireless technology, for example, Bluetooth® technology for connecting the glasses to a mobile phone, tablet, or other smart device in order to permit the transmission or playing or receiving of music, phone calls, and other audio by the glasses 100. In some embodiments, the temples 102 include a microphone (not shown), battery (not shown), bone conduction speakers, one or more printed circuit boards (not shown), a control pad (not shown), a connectivity module and hardware (not shown), and a cellular communications unit and hardware (not shown) which may be configured to enable the glasses 100 to communicate over a wireless network, for example, Bluetooth® wireless networks, cellular wireless networks, WiFi, near field communication and/or other types of wireless technology standards to pair and/or communicate with other electronic devices, for example, mobile devices including smartphones and smartwatches. In some embodiments, other components which are not depicted in the exemplary embodiments disclosed herein, may be incorporated into the glasses 100.

In accordance with various embodiments of the present invention, the liberation of the shield members 110 from the temples 102 may enable users to quickly and/or easily modify a pair of glasses 100 to include a facial safety feature. In some embodiments, a user can add or remove the shield members 110 from the glasses, even when wearing gloves or when the user's hands are wet or oily. In some examples, the protruding tab members 112 and/or the magnet members 114 disposed thereon support the ability for user to quickly and/or easily add or remove the shield members 110 from the glasses 100, for example, while wearing gloves (e.g. disposable, utility, safety, or any other similar types of gloves).

Moreover, in some scenarios, the ability for the shield members 110 to be liberated from the glasses 100 may enable users of any type of glasses, for example, prescription glasses to wear their glasses during non-safety activities (e.g., when the safety shields would not be needed), and simply add the safety shield members when needed for safety. In some examples, this configuration enables users, for example, prescription glasses wearers, to not have to purchase a second pair of glasses, for example, an additional pair of glasses just for safety application or usage. In accordance with some examples, should a user decide to update enhance or modify their glasses to include a safety feature, the user is able to easily connect and disconnect the shield members 110, for example, the protruding tab members 112 of the shield members which may have one or more magnet members 114 disposed thereon, to the temples 102, for example, to the receiving holes 104 disposed on the temples 102, which may have one or more magnet members disposed therein, configured attract the magnet members 114 of the protruding tab members. Alternatively, should the user decide to use the glasses for a non-safety application, the user would simply disconnect the shield members 110 from the temples 102 by applying a force greater than the magnetic force of the magnet members of the protruding tab members 112 and the receiving holes 104 and/or the frictional force created by the abutment of the side walls of the protruding tab members 112 with the receiving holes 104 of the temples 102. In this manner, a user may own a single pair of glasses 100 and selectively enhance the utility of their glasses, for example, by adding a safety feature, without having to purchase a second, new pair of glasses, for example, facial safety glasses.

In accordance with several embodiments of the present invention, the glasses device 100 disclosed herein may require less material than would be traditionally required, as a user may simply acquire a glasses device having the ability to removably connect to safety shields 110 (e.g., prescription glasses having receiving holes configured to connect to one or more safety shields) without having to purchase two separate types of glasses (e.g., a pair of prescription glasses and a pair of safety glasses).

In accordance with embodiments of the present invention, the temples 102 of the glasses 100 can include wireless technology, for example, Bluetooth® technology for connecting the glasses to a mobile phone, tablet, or other smart device in order to permit the transmission or playing of music, phone calls, and other audio by the glasses 100 through bone conduction or other speakers 110. In some embodiments, the temples 102 may transmit and receive music, phone calls and other audio by the glasses 100 through in-ear or over-ear headphones disposed on or extending from the temples 102.

In accordance with several embodiments of the present invention, safety shield members 110 may be configured to disconnect from the temples 102 without requiring the disconnection of any electronic wires. In accordance with embodiments of the present invention, the safety shield members 110 may be configured to connect to the receiving holes 104 in the temples 102 without disturbing any wires within the temples 102.

In accordance with several embodiments of the present invention, the wireless communication technology of the glasses device 100 may be configured such that disconnecting the safety shield members 110 from the temples 102 does not disrupt the electronic connection between each of the temples 102. Also for example, the glasses 100 may be configured such that disconnecting the safety shield members 110 from the temples 102 does not disrupt the connection between the temples 102 and a mobile device, for example, a smart device, to which it may be wirelessly connected to.

In accordance with embodiments of the present invention, an actuation button (e.g., a control button) 106 may be disposed on one or both of the temples 102 of the glasses 100. In some examples, the actuation button 106 may be configured to power the temples 102 on or off, or may be used to toggle between different user selection options, for example, to activate a voice control assistant, make a call, or begin playing music. In some embodiments, different pressing gestures of the actuator button 106 may activate different functionalities of the glasses. For example, a long press may turn the device 100 on or off, whereas a double or triple press may activate a voice assistant. In any embodiment, the actuation button 106 may be configured to be used in a similar manner to activate different functionalities of the glasses device 100. In some embodiments, the actuation button 106 may be disposed on a bottom side of the temples 102. As shown in the depicted example, the actuation button 106 may be generally circular (e.g, cylindrical) in shape, however, in any embodiment, the actuation button 106 may be square, rectangular, oval, triangular, or any other geometric shape. In some scenarios, the actuation button may utilized by a user, for example, to power the device 100 on or off, without interfering with or dislodging the safety shield members 110 from the temples 102.

In accordance with embodiments of the present invention, the shield members 110 may be configured to be easily inserted or removed from the glasses 100, for example, to support improved usage of the glasses, for example, before or after cleaning the glasses lenses disposed on the front frame member 101 of the glasses. For example, the shield members 110 may be removed to enable a user to properly clean the lenses of the glasses 100, and then quickly and easily reattached after such a cleaning. In some examples, the protruding tabs 112 with magnet members 114 disposed thereon support the quick and easy application or removal of the safety shields 110 to the glasses temples 102, for example, before or after lens cleanings.

In accordance with embodiments of the present invention, the glasses 100 may be configured to be operable while the safety shields 110 are inserted. For example, the glasses 100 may be smartglasses including wireless technology which may be operable by use of buttons which may not be interrupted by the placement of the safety shield members 110. For example, the safety shield members 110 can be connected to or removed from smartglasses without disrupting access to or functioning of any buttons, for example, one or more actuator buttons 106 which may be disposed on the temples 100 of the glasses 100, for example, smartglasses. Also for example, the safety shield members 100 may be connected to or removed from a bottom surface of the glasses temples 102, without disrupting access to or functioning of any buttons, for example, one or more actuator buttons 106, which may be disposed on the temples 102 of the smartglasses. In some examples, the placement of the receiving holes 104 disposed on the temples 102, the placement of the protruding tabs 112 on the shield members 110 and/or the shape of the safety shield members 110, for example, the curved shape of the shield portion 118, may enable operation of buttons disposed on the glasses temples 102, for example, one or more actuator buttons or smartglasses control buttons 106, while the shield members 110 are inserted in the temples 102.

In accordance with embodiments of the present invention, the shield members 110 may be configured to enhance the safety of the glasses 100 by providing a safety features to glasses 100, for example, smartglasses, while opening an information channel, for example, an audible information channel which may be provided by the smartglasses, which may be configured to provide instructions, training, and/or accident or injury notifications or other hazard alerts during use of the smartglasses.

References made to "glasses" or "glasses assembly" made throughout this written description may be understood to mean, in any context, prescription glasses, sunglasses, smartglasses, and/or any similar glasses or glasses assemblies or any combination thereof In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration except-ing those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The invention claimed is:

1. A smartglasses assembly comprising:

a front frame;

a pair of temples configured with wireless communication technology and having one or more receiving holes disposed on a bottom surface thereof; and a pair of removable shield members connectable to the temples, each shield member having a shield portion and one or more tab members extending from a top section of each of the shield portions and corresponding in shape to the temple receiving holes;

wherein the temple receiving holes are each adapted to receive and releasably secure a shield member of the pair and at least one of the tab members have one or more magnetic members disposed thereon adapted to engage with corresponding magnetic members disposed in the receiving holes; and wherein one or more actuator buttons extend from a surface of the temples, at least one actuator button configured to control the wireless communication technology of the temples the wireless communication technology configured and programmed to transmit and receive electronic signals, and connection or removal of one or both of the shield members does not disrupt functioning of the temple actuator buttons or transmission and reception of the electronic signals to or from the temples.

2. The smartglasses assembly of claim 1, wherein the shield member tabs are smooth and elongate, and releasably secure to the temple receiving holes without a biasing force, and wherein the electronic signals comprise audio.

3. The glasses assembly of claim 1, wherein the ability for the tab members to magnetically connect to the receiving holes of the temples enables a user's use of the glasses assembly while wearing gloves.

4. The smartglasses assembly of claim 1, wherein connection of a first shield member of the pair to a first temple of the pair is independent of connection of a second shield member of the pair to a second temple of the pair.

5. A smartglasses assembly comprising:
a front frame;
a pair of temples integrated with wireless communication technology for transmitting and receiving audio, each temple having an opening disposed on a bottom surface thereof and extending a distance into the temples to form a channel, the channel terminating at an end wall in communication with at least one ferromagnetic member; and
a pair of removable shield members connectable to the temples, each shield member having a shield portion and a tab member extending from a top surface of the shield portion and adapted to friction fit within a corresponding channel of the temple, each tab member further comprising at least one ferromagnetic element adapted to engage with at least one ferromagnetic member of the temples to releasably secure the shield members to the temples by magnetic force; and
wherein at least one smartglasses control button extends from a middle section of a bottom surface of at least one temple, and engagement of the pair of shield members with the corresponding temples does not disrupt access to the control buttons of the corresponding temple or transmission and reception of audio by the wireless communication technology of the temples.

6. The smartglasses assembly of claim 5, wherein each temple opening and receiving hole is rectangular in shape and is adapted to receive correspondingly shaped tab members of the shield members to releasably connect the shield members to the temples without a biasing force.

7. The smartglasses assembly of claim 5, wherein the tab members protrude from a top portion of each shield portion, and each shield member further comprises a curved edge.

8. The smartglasses assembly of claim 7, wherein upon connection of each shield member to corresponding receiving holes in the temples, the curved edge becomes flush with a bottom side of the temple to which it is connected to.

9. The smartglasses assembly of claim 6, wherein the shield members are installable on the temples while the smartglasses assembly is worn on the face of a user.

10. A removable shield member for smartglasses comprising:
a shield portion comprising a substantially smooth and continuous exterior sidewall, the sidewall having a first, curvilinear edge configured to substantially abut a front frame of smartglasses and a second edge configured to substantially abut a bottom surface of smartglasses temples, the edges forming a substantially non-perpindicular corner, the shield portion configured to shield user's eyes and prevent debris from entering user's eyes;
a tab members protruding from a top surface of the shield portion, the tab member being an elongate body having a continuous, substantially smooth exterior surface and comprising a magnetic element to facilitate magnetic connection with a corresponding ferromagnetic member in a receiving hole of a smartglasses temple; and
wherein installation or removal of the shield member to or from the smartglasses temple does not disrupt functioning of actuator buttons or transmission and reception of the electronic signals of the temple.

11. The removable shield member of claim 10, wherein the tab members are formed to correspond to one or more receiving holes disposed on the temples of the smartglasses.

12. The removable shield member of claim 10, wherein the tab members are formed to correspond to one or more receiving holes disposed on end pieces of the smartglasses.

13. The removable shield member of claim 10, wherein the tab members protrude from a top portion of the shield portion.

14. The removable shield member of claim 10, wherein at least one tab member is curved and at least one tab member is straight, and wherein the straight tab member is configured to engage with at least one temple receiving hole.

15. The smartglasses assembly of claim 1, wherein the one or more actuator buttons are integrated with the temples.

16. The smartglasses assembly of claim 1, wherein the pair of safety shield tab members are retained within the receiving holes without a biasing force.

17. The smartglasses assembly of claim 5, wherein the one or more control buttons are integrated with the temples.

18. The removable shield member of claim 10, wherein the pair of said safety shield tab members are retained within the receiving holes without a biasing force.

19. The removable shield member of claim 10, wherein the tab members are removable from the smartglasses temples receiving holes by applying a downward force on the shield portion of the safety shields.

20. The removable shield member of claim 10, wherein the shield portion sidewall is uninterrupted by raised features.

* * * * *